Figure 1:
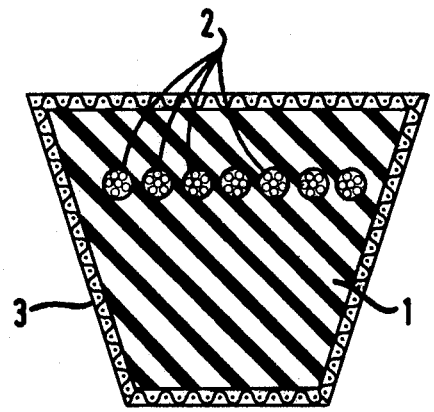

United States Patent [19]
Cicognani

[11] 3,992,959
[45] Nov. 23, 1976

[54] TENSION RESISTANT STRUCTURE FOR DRIVING BELTS AND THE LIKE
[75] Inventor: Mario Cicognani, Milan, Italy
[73] Assignee: Industrie Pirelli S.p.A., Milan, Italy
[22] Filed: Feb. 28, 1975
[21] Appl. No.: 554,189

[30] Foreign Application Priority Data
Mar. 7, 1974 Italy .................................. 49092/74

[52] U.S. Cl. ..................................... 74/234; 74/237
[51] Int. Cl.² ....................... F16G 5/00; F16G 1/22; F16G 5/10
[58] Field of Search .................. 74/234, 237, 231 R

[56] References Cited
UNITED STATES PATENTS

| | | | |
|---|---|---|---|
| 1,256,011 | 2/1918 | Gammeter | 74/234 X |
| 2,404,271 | 7/1946 | Brunner | 74/234 |
| 2,770,977 | 11/1956 | Beckadolph et al. | 74/234 X |
| 3,068,710 | 12/1962 | Beckadolph et al. | 74/237 |
| 3,117,460 | 1/1964 | Traeger | 74/237 X |
| 3,479,892 | 11/1969 | Cicognani | 74/237 X |

Primary Examiner—Leonard H. Gerin
Attorney, Agent, or Firm—Stevens, Davis, Miller & Mosher

[57] ABSTRACT

A tension resistant structure for driving belts and driving belts containing the tension resistant structure are provided. The tensioning structure comprises laterally spaced cords which extend substantially parallel to the longitudinal axis of the belt, the cords contain only seven threads of the polyamide, polyester or rayon with at least six of the threads being helically twisted together and disposed concentrically about the longitudinal axis of the cord, the physical characteristics of the cords are such that $p(1 + K) = Rd$ wherein $p$ is the pitch of the spiral of each thread; $d$ is the diameter of the thread; $R$ is between 27.4 and 35.1 and $K$ is 0 to 0.03 when the thread is rayon; 0.01 to 0.07 if the thread is polyester; and 0.01 to 0.1 if the thread is polyamide.

9 Claims, 3 Drawing Figures

TENSION RESISTANT STRUCTURE FOR DRIVING BELTS AND THE LIKE

The present invention relates to a tension resistant structure for driving belts and the like, in which the resistant structure is a plurality of parallel cords, arranged along the layout of the belt.

More particularly, the present invention relates to the cords forming the tension resistant structure of a driving belt and the like.

Many cords of different materials for forming the tension resistant structures of driving belts and the like are already known. Such cords may be subjected to one of several different treatments before they are embedded in the elastomeric material forming the belt body. Different geometrical configurations of the elements, i.e. the threads, have been used to form the cords.

The known cords, however, do not produce tension resistant structures for driving belts which are satisfactory from the point of view of the elongation of the belts in use, which results also in an unsatisfactory useful life of the latter.

An object of the present invention is to reduce the elongation of driving belts during use. Another object of the invention is to provide a driving belt of improved tension resistance. Still another object of the invention is to provide an improved tension resistant structure for driving belts.

Figure 2:
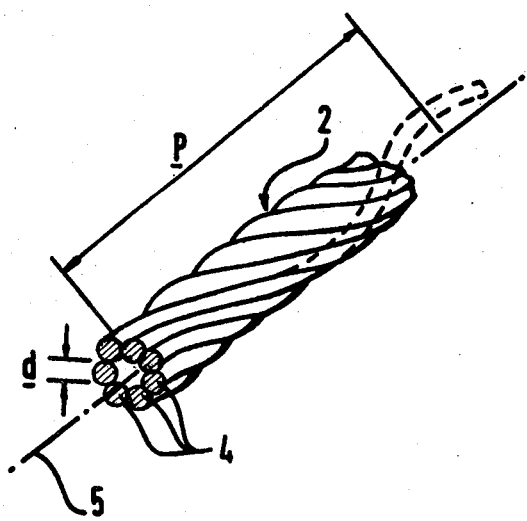
Figure 3:
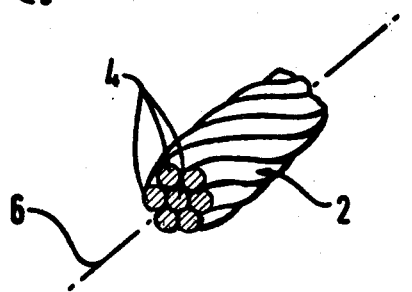

Other objects will become apparent from the following description with reference to the accompany drawing wherein FIG. 1 illustrates in cross-section one embodiment of the invention;

FIG. 2 is an enlarged perspective view of one embodiment of the cord of the belt of FIG. 1; and FIG. 3 is an enlarged perspective view of a second embodiment of the cord of the belt of FIG. 1.

The foregoing objects and others are accomplished in accordance with this invention by providing a driving belt having a plurality of cords having their axes parallel and positioned along the layout of the belt, characterized in that each cord is formed by seven threads of textile fibers twisted together.

FIG. 1 illustrates in cross-section a V-shaped driving belt and this only by way of example, because the present invention relates to all types of driving belts, such as, for example, flat belts, toothed, and cogged belts and the like.

The V-shaped belt shown in FIG. 1 comprises a belt body 1 of elastomeric material having a plurality of laterally spaced cords 2 embedded therein which extend longitudinally through the belt and form the tension resistant structure thereof.

The elastomeric material of the belt body is enclosed within a fabric 3.

In FIG. 1, the cords 2 have their axes parallel and lying in a plane coincident with the neutral plane of the belt.

The cords 2 are equal to one another and, in one embodiment, a cord 2 has the configuration shown in FIG. 2.

As visible in FIG. 2, the cord 2 is formed by seven threads 4 twisted together. In particular, the seven threads 4, in a section perpendicular to the axis 5 of the cord 2, have their axes situated on a circle concentric to said axis 5.

The configuration of the threads of the cord represented in FIG. 2 may not take place in practice over the whole length of a cord. In fact, in some portions of a cord one of the seven threads 4 forming it, and not necessarily the same in the different portions, may enter the central hollow zone of the cord, modifying in this way the configuration represented in FIG. 2.

In an alternative embodiment the cords 2 may have the configuration represented in FIG. 3.

As can be seen in FIG. 3, one of the seven threads 4 is situated with its axis corresponding to the axis 6 of the cord, and the other threads 4 have their centers disposed on a circumference which is concentric to axis 6.

Moreover, in the cords 2, the seven threads 4, whichever is their geometrical configuration, must comply with the following relationship, deduced experimentally and valid in the range of $d$ values comprised between 0.1 and 1 mm:

$$p(1 + K) = Rd$$

where $p$ is the pitch of the spiral of one thread; i.e. the distance between two successive thread spirals measured on the axis of the cord;

$d$ is the diameter of one thread;

$R$ is a parameter preferably equal to 30.8 and in any case is within the range of values between 27.4 and 35.1; and $K$ is a parameter depending on the type of material forming the threads. In particular, if the threads 4 are made of rayon, $K$ is a value between 0 and 0.03; if the threads 4 are made of polyester fibers, $K$ is a value ranging between 0.01 and 0.07 and if the threads are made of polyamide fibers, $K$ is a value between 0.01 and 0.1.

Cords provided by the present invention have been used to build up belts which have been subjected to a laboratory test and to tests on machines employing belt transmission systems.

Identical tests have been carried out on belts having a resistant insertion formed by cords of known type. From the tests, the belts according to the present invention, have proved by far better than the belts of known type from the point of view of:

dynamometric resistance, which has increased by 25%;

average life, which has increased by 60%;

maximum elongation at the test end which is reduced by 50%.

These tests are surprising and unexpected.

The explanation of the achievement of the results, probably and partially is a consequence of the greater rigidity of the cords described above in respect of the cords of known type.

Although the invention has been described in detail for the purpose of illustration it is to be understood that such detail is solely for that purpose and that variations can be made therein by those skilled in the art without departing from the spirit and scope of the invention except as it is limited by the claims.

What I claim is:

1. A tension resistant structure for driving belts and the like, of the type formed by a plurality of cords having their axes parallel and positioned along the layout of the belt, each cord being formed by seven threads of textile fibers twisted together characterized in that in each cord the pitch $p$ of the threads constituting it and the diameter $d$ of the threads are correlated by the formula $$p(1+K) = Rd$$

where $R$ is a parameter selected in the range of values between 27.4 and 35.1 and $K$ is a parameter whose values depend on the material from which the cord is made.

2. The tension resistant structure of claim 1 wherein each cord has the seven threads helically arranged about the axis of the cord with their axes lying on a circle concentric to the axis of the cord.

3. The tension resistant structure of claim 1 wherein in a casual way lengths of each of the seven threads forming one cord are arranged along the axis of said cord and are contoured by lengths of the other six threads.

4. The tension resistant structure of claim 1, characterized in that $R$ is a parameter equal to 30.8.

5. The tension resistant structure of claim 1, characterized in that the parameter $K$, when the material forming the threads of the cords is rayon, is a value selected in the range of values between 0 and 0.03.

6. The tension resistant structure of claim 1, characterized in that the parameter $K$, when the material forming the threads of the cords is a polyester, is a value selected in the range of values between 0.01 and 0.07.

7. The tension resistant structure of claim 1, characterized in that the parameter $K$, when the material forming the threads of the cords is a polyamide, is a value selected in the range of values between 0.01 and 0.1.

8. An elastomeric driving belt having embedded therein laterally spaced cords which extend substantially parallel to the longitudinal axis of the belt, said cords comprising only seven threads of polyamide, polyester or rayon with at least six of the threads being helically twisted together and disposed concentrically about the longitudinal axis of the cord, said cords having physical characteristics whereby $$p(1+K) = Rd$$

wherein $p$ is the pitch of the spiral of each thread; $d$ is the diameter of the thread and between 0.1 and 1 mm.; $R$ is between 27.4 and 35.1 and $K$ is 0 to 0.03 when the thread is rayon, 0.01 to 0.07 if the thread is polyester; and 0.01 to 0.1 if the thread is polyamide.

9. The belt of claim 8 wherein one of the threads is disposed along the axis of the cord and the others are helically twisted thereabout.

* * * * *